(12) United States Patent
Hara et al.

(10) Patent No.: US 10,919,113 B2
(45) Date of Patent: Feb. 16, 2021

(54) LASER LAP-WELDED JOINT, METHOD OF MANUFACTURING THE SAME, AND AUTOMOBILE FRAMEWORK COMPONENT

(71) Applicant: JFE STEEL CORPORATION, Tokyo (JP)

(72) Inventors: Asato Hara, Tokyo (JP); Yasushi Kitani, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 219 days.

(21) Appl. No.: 16/084,384

(22) PCT Filed: Mar. 6, 2017

(86) PCT No.: PCT/JP2017/008749
§ 371 (c)(1),
(2) Date: Sep. 12, 2018

(87) PCT Pub. No.: WO2017/159425
PCT Pub. Date: Sep. 21, 2017

(65) Prior Publication Data
US 2019/0076963 A1 Mar. 14, 2019

(30) Foreign Application Priority Data
Mar. 15, 2016 (JP) .............................. JP2016-050755

(51) Int. Cl.
*B23K 26/244* (2014.01)
*B23K 26/32* (2014.01)
(Continued)

(52) U.S. Cl.
CPC ........ *B23K 26/244* (2015.10); *B23K 26/0869* (2013.01); *B23K 26/32* (2013.01);
(Continued)

(58) Field of Classification Search
CPC .............. B23K 26/244; B23K 26/0869; B23K 2101/006; B23K 2103/04
(Continued)

(56) References Cited

U.S. PATENT DOCUMENTS 4,658,110 A * 4/1987 Miller .................. B23K 15/008
219/121.13
4,661,677 A * 4/1987 La Rocca ............ B23K 26/244
219/121.14

(Continued)

FOREIGN PATENT DOCUMENTS

JP H06-170567 A 6/1994
JP H07-10032 A 1/1995

(Continued)

OTHER PUBLICATIONS

Apr. 4, 2017 International Search Report issued in International Patent Application No. PCT/JP2017/008749.

(Continued)

Primary Examiner — Thien S Tran
(74) Attorney, Agent, or Firm — Oliff PLC

(57) ABSTRACT

A laser lap-welded joint being formed from stacked steel sheets and including a plurality of welded portions each having a substantially C-shaped surface, each of the welded portions being formed of a first linear portion and second linear portions having a surface having a semicircular shape. The radius R of the semicircular shape and the sheet thickness t of one of the steel sheets having a larger sheet thickness satisfy $0<R\leq 1.5$ t. The pitch $\lambda$ between the adjacent welded portions and a weld length l satisfy $0.4\leq l/\lambda<0.7$. The space X between an end of a contact portion where the steel sheets are in contact with each other and each of the (Continued)

welded portions satisfy 2 t≤X≤4 t. The sheet thickness t and the width W of each of the welded portions satisfy 0.3≤W/t≤1.0.

4 Claims, 3 Drawing Sheets

(51) Int. Cl.
 *B23K 26/08* (2014.01)
 *B23K 101/00* (2006.01)
 *B23K 103/04* (2006.01)
 *B23K 101/18* (2006.01)
(52) U.S. Cl.
 CPC .... *B23K 2101/006* (2018.08); *B23K 2101/18* (2018.08); *B23K 2103/04* (2018.08)
(58) Field of Classification Search
 USPC ............. 219/121.14, 121.63, 121.64, 121.84
 See application file for complete search history.

(56) References Cited

U.S. PATENT DOCUMENTS

| | | | | |
|---|---|---|---|---|
| 7,939,779 | B2* | 5/2011 | Zauner | B23K 26/10 219/121.61 |
| 2006/0163221 | A1* | 7/2006 | Makase | B23K 26/082 219/121.64 |
| 2007/0084835 | A1* | 4/2007 | Dinauer | B23K 26/082 219/121.64 |
| 2010/0147809 | A1* | 6/2010 | Geisler | B23K 26/244 219/121.64 |
| 2016/0052091 | A1* | 2/2016 | Uchida | B23K 26/03 219/121.64 |
| 2016/0332257 | A1* | 11/2016 | Kawamoto | B23K 26/244 |
| 2017/0050269 | A1* | 2/2017 | Nakagawa | B23K 26/0626 |
| 2017/0106470 | A1* | 4/2017 | Solomon | B23K 26/22 |

FOREIGN PATENT DOCUMENTS

| | | |
|---|---|---|
| JP | 2002-079388 A | 3/2002 |
| JP | 2004-98122 A | 4/2004 |
| JP | 2006-142917 A | 6/2006 |
| JP | 2006-315062 A | 11/2006 |
| JP | 2009-233712 A | 10/2009 |
| JP | 2009-255134 A | 11/2009 |
| JP | 2010-12504 A | 1/2010 |
| JP | 2012-240118 A | 12/2012 |
| WO | 2015/130206 A1 | 9/2015 |

OTHER PUBLICATIONS

Nov. 5, 2019 Office Action issued in Chinese Patent Application No. 201780017056.X.
Apr. 8, 2020 Notice of Allowance issued in Korean Patent Application No. 10-2018-7026262.

* cited by examiner

LASER LAP-WELDED JOINT, METHOD OF MANUFACTURING THE SAME, AND AUTOMOBILE FRAMEWORK COMPONENT

TECHNICAL FIELD

This application relates to a laser lap-welded joint, a method of manufacturing the welded joint, and an automobile framework component formed by using the welded joint.

BACKGROUND

In the related art, resistance spot welding has been employed for welding of an automobile structural member that includes a flange portion. However, resistance spot welding has the following problems: it takes time to weld, a pitch cannot be reduced because a heat value decreases due to shunt current, and there is a spatial limitation due to a gun of a welder. Therefore, in recent years, studies have been conducted on laser welding other than resistance spot welding in the related art. In laser welding, if the gap between sheets (sheet gap) is too large, burn-through occurs. In contrast, in the case of zinc-coated steel sheets, zinc coating at the overlapping surfaces of the zinc-coated steel sheets becomes vaporized and sputtered unless an appropriate sheet gap is secured, and consequently, it is necessary to control the sheet gap.

For example, Patent Literature 1 discloses an automobile framework component that is formed in a shape having a closed cross section by welding together a flange portion of a frame component having a substantially hat-like shape when viewed in cross section and another frame component or a panel component disposed so as to face the flange portion and that is formed by performing continuous welding at a position X by a one-side welding method, the position X being expressed by the following formula when welding position coordinates are determined in a coordinate system in which an end of a contact portion where the flange portion and the other frame component or the panel component are in contact with each other is set to 0 and in which a first side on which a flange outer end of the flange portion is present and a second side on which a vertical wall of the substantially hat-like shape is present are respectively set to be the negative (−) side and the positive (+) side, and when the radius of an arc-shaped portion connecting the vertical wall of the substantially hat-like shape and the flange portion to each other is denoted by R (mm).

$$+\sqrt{(2Ra-a^2)} \geq X > 1.5$$

where: $R \geq 2$ (unit: mm), a: weldable gap volume

Patent Literature 2 discloses a method of manufacturing a laser-welded structural member. In this method, a steel sheet that includes a bent portion and a flange, which is continuous with the bent portion, and another one or more steel sheets are stacked one on top of the other in such a manner that the flange overlaps the other one or more steel sheets, and a first laser welding is performed on the overlap portion so as to form a first laser-welded portion. Then, after the temperature of the first laser-welded portion has fallen below the Mf point, a second laser welding is performed so as to form a second laser-welded portion in a region in the vicinity of the first laser-welded portion, which has been formed, the region being located on the side opposite to the side on which the bent portion is present with the first laser-welded portion interposed therebetween, and tempering is performed by the second laser welding on a heat-affected zone of the first laser-welded portion in such a manner that the hardness of the heat-affected zone is 90% or less of the hardness of a heat-affected zone of the second laser-welded portion. As a result, a laser-welded structural member is manufactured.

Patent Literature 3 discloses an impact absorption member that has a closed cross-sectional structure at least one side of which is formed of a steel sheet having a hat-like shape when viewed in cross section and that has a favorable impact absorption characteristic. In this impact absorption member, the ratio (L/λ) of a weld length L of each of welding beads intermittently formed along the longitudinal direction of a flange portion of the steel sheet, which has a hat-like shape when viewed in cross section, to a weld pitch λ of the welding beads is 0.2 or greater and 0.95 or less, and the ratio (W/t) of a melt width W to a sheet thickness t on an overlap surface of the flange portion is 1.0 or greater and 3.0 or less.

CITATION LIST

Patent Literature

PTL 1: Japanese Unexamined Patent Application Publication No. 2012-240118
PTL 2: Japanese Unexamined Patent Application Publication No. 2010-12504
PTL 3: Japanese Unexamined Patent Application Publication No. 2006-142917

SUMMARY

Technical Problem

However, in the technology described in Patent Literature 1, continuous welding is performed on a portion in which the flange portion having the substantially hat-like shape and another component are not in contact with each other. Thus, there is a problem in that heat input increases, so that the amount of thermal strain increases and that the dimensional accuracy decreases.

In the technology described in Patent Literature 2, laser welding is performed twice, and thus, there is a problem in that it takes a long welding time and that the amount of thermal strain increases, and as a result, the dimensional accuracy decreases.

The technology described in Patent Literature 3 focuses on an impact absorption characteristic and does not take consideration of peel strength and has a problem in that a sufficient peel strength is not obtainable.

Accordingly, it is an object of the disclosed embodiments to provide a laser lap-welded joint capable of ensuring a sufficient peel strength and improving dimensional accuracy by reducing strain due to thermal strain, a method of manufacturing the welded joint, and an automobile framework component formed by using the welded joint.

Solution to Problem

The inventors have found that, in order to improve peel strength and dimensional accuracy of a joint in which a component that includes a flange portion and another component are welded together, two things that are (a) the shapes of the ends of a weld line and (b) the size of the gap between the components should be controlled, and more preferably, in addition to the above two things, other three things that are (c) a welding position in a flange width direction, (d) a welding ratio in a flange longitudinal direction, and (e) the width of the weld line should be controlled, and thereby an improvement in peel strength and dimensional accuracy can be realized.

The disclosed embodiments have been completed on the basis of the above findings, and the gist is as follows.

[1] A laser lap-welded joint includes two steel sheets and a plurality of welded portions that are formed by welding and joining together the two steel sheets which are in a state of being stacked one on top of the other. Each of the plurality of welded portions has a substantially C-shaped surface being arranged in an array. Each of the welded portions is formed of a first linear portion extending in an array direction and second linear portions which are formed at ends of the first linear portion and each of the second linear portions has a surface having a semicircular shape. A radius R (mm) of the semicircular shape and a sheet thickness t (mm) of one of the steel sheets having a sheet thickness larger than a sheet thickness of the other of the steel sheets (when the two steel sheets have an identical sheet thickness, the identical sheet thickness is set to be the sheet thickness t) satisfy a formula (1). A gap G (mm) between the two steel sheets and the sheet thickness t satisfy a formula (2). A ratio l/λ of a weld length l (mm) to a pitch λ (mm) between the welded portions that are adjacent to each other satisfies a formula (3) and the weld length l (mm) is a sum of a length of the first linear portion and lengths of the second linear portions in each of the welded portions. The sheet thickness t satisfies a formula (4). A space X (mm) between an end of a contact portion where the two steel sheets are in contact with each other and each of the welded portions satisfies a formula (5). A ratio W/t of a width W (mm) of each of the welded portions to the sheet thickness t satisfies a formula (6). At least one of the two steel sheets has a composition containing, in % by mass, C: higher than 0.07% and 0.25% or lower, P+S: lower than 0.03%, Mn: 1.8% or higher and 3.0% or lower, and Si: higher than 1.2% and 1.8% or lower and having the balance being Fe and unavoidable impurities, the at least one of the two steel sheets having a tensile strength TS of 980 MPa or greater.

$$0 < R \leq 1.5t \quad (1)$$

$$G \leq 0.25t \quad (2)$$

$$0.4 \leq l/\lambda < 0.7 \quad (3)$$

$$t \leq 4.0 \text{ mm} \quad (4)$$

$$2t \leq X \leq 4t \quad (5)$$

$$0.3 \leq W/t \leq 1.0 \quad (6)$$

[2] A method of manufacturing the laser lap-welded joint described in the above [1], the method including stacking two steel sheets one on top of the other and performing one-side welding in which laser is radiated onto a surface of the two steel sheets stacked one on top of the other.

[3] In the method described in the above [2], laser welding is started from a side on which one of the two steel sheets having a sheet thickness larger than a sheet thickness of the other of the steel sheets is present.

[4] An automobile framework component includes the laser lap-welded joint described in the above [1].

Advantageous Effects

According to the disclosed embodiments, a sufficient peel strength can be ensured, and dimensional accuracy can be improved by reducing strain due to thermal strain.

DETAILED DESCRIPTION

The disclosed embodiments will be described below with reference to the drawings. The scope of this disclosure is not intended to be limited to any of the following specific embodiments.

<Automobile Framework Component>

An automobile framework component according to the disclosed embodiments is obtained by forming the following laser lap-welded joint. It is preferable that the automobile framework component according to the disclosed embodiments be applied to a center pillar. It is important for a center pillar to ensure peel strength, and a center pillar to which the automobile framework component according to the disclosed embodiments is applied has a sufficient peel strength.

<Laser Lap-Welded Joint>

Figure 1:
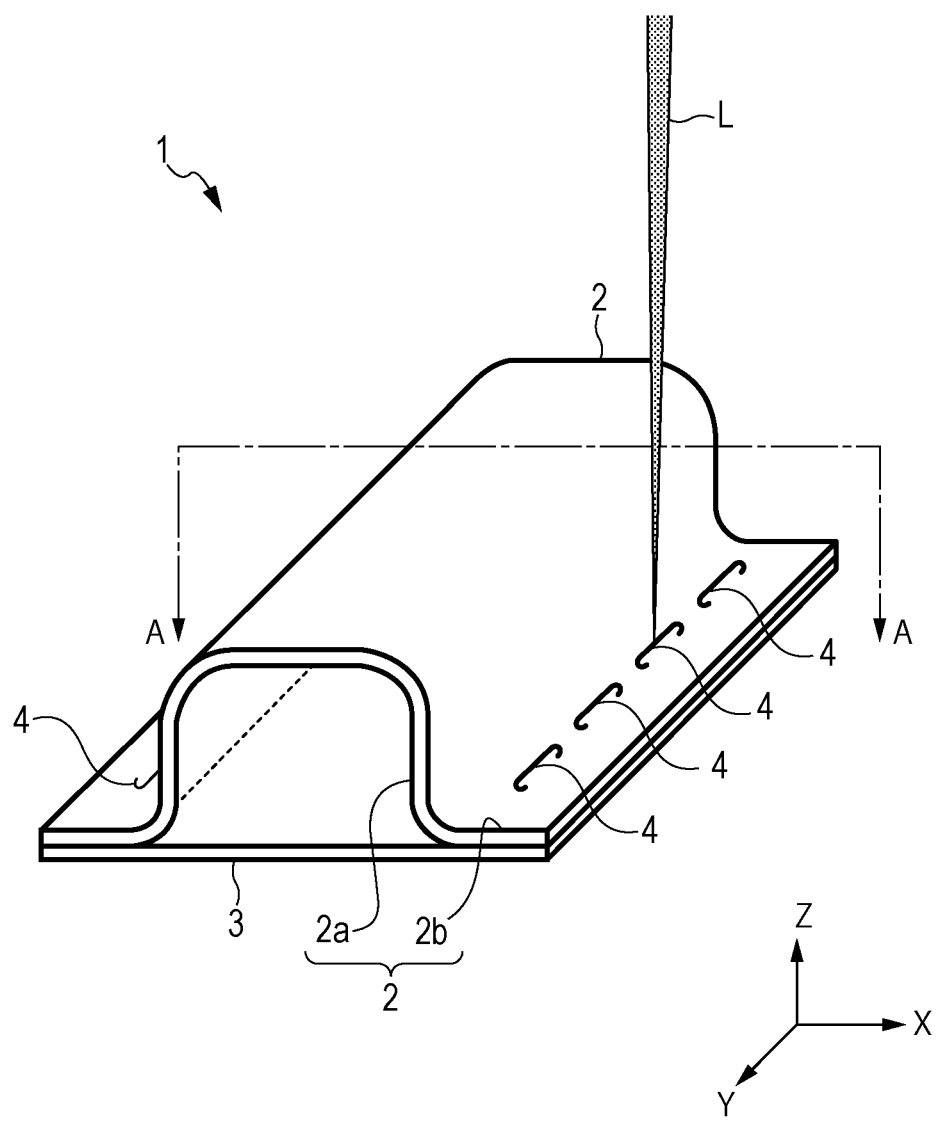
FIG. 1 is a perspective view illustrating a configuration of a laser lap-welded joint according to an embodiment.

A laser lap-welded joint 1 according to the disclosed embodiments includes at least two steel sheets stacked one on top of the other. FIG. 1 is a perspective view illustrating an example of the laser lap-welded joint 1 according to an embodiment. FIG. 1 illustrates the laser lap-welded joint 1 that is formed in a shape having a closed cross section by welding together a flange portion 2b of a steel sheet 2 (a frame component) that has a substantially hat-like shape when viewed in cross section and another frame component or a panel-shaped steel sheet 3 that is disposed so as to face the flange portion 2b. The automobile framework component is obtained by forming the laser lap-welded joint 1.

The laser lap-welded joint 1 according to disclosed embodiments will be described below as a member formed of the steel sheets 2 and 3 stacked one on top of the other including a member obtained by welding such a flange portion and a frame component or a panel component together. In addition, as the laser lap-welded joint 1 according to the disclosed embodiments, although a case will be described as an example in which the two steel sheets 2 and 3 are stacked one on top of the other, three or more steel sheets may be stacked on top of one another.

As illustrated in FIG. 1, the laser lap-welded joint 1 according to the disclosed embodiments includes the two steel sheets 2 and 3 stacked one on top of the other. The steel sheet 2 is formed of a flange portion and other portions and includes a vertical wall portion 2a and a flange portion 2b.

The flange portion 2b of the steel sheet 2 and the panel-shaped steel sheet 3 are superposed with each other, and laser L is intermittently radiated in the longitudinal direction of the flange portion 2b (the y direction in FIG. 1), so that a plurality of weld beads 4 (hereinafter also referred to as welded portions 4) can be intermittently formed so as to be arranged in the longitudinal direction of the flange portion 2b. The welded portions 4 join the steel sheets 2 and 3 to each other and each has a substantially C-shaped surface. In this manner, the steel sheet 2 formed of the flange portion and the other portions and the panel-shaped steel sheet 3 form the closed cross section.

Figure 2:
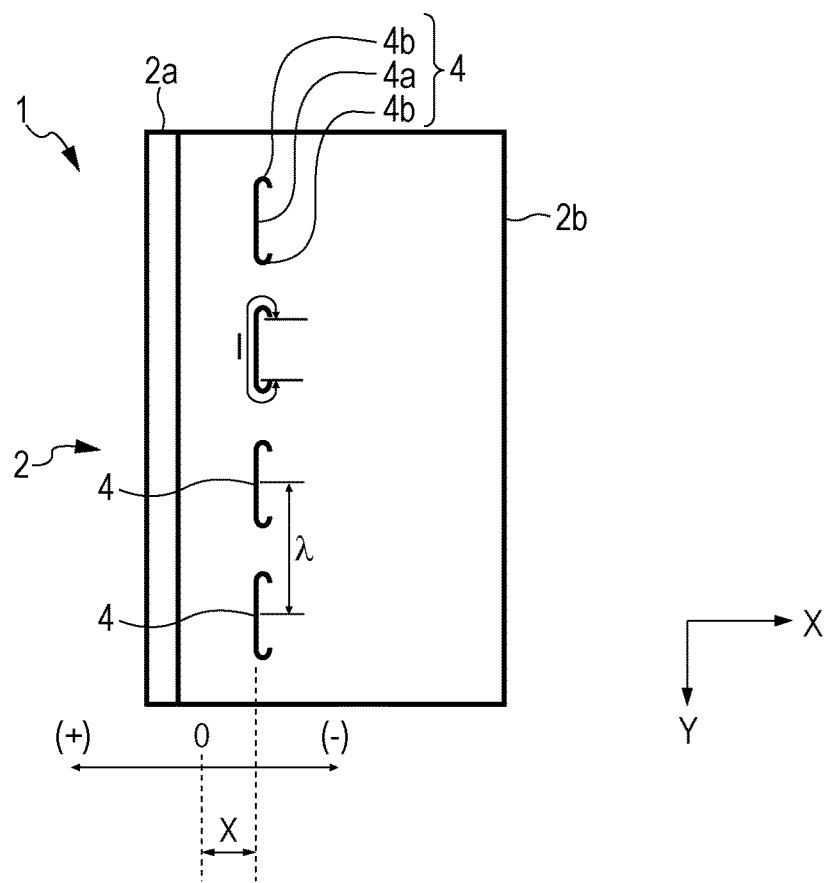
FIG. 2 is a top view illustrating the configuration of the laser lap-welded joint according to an embodiment.
Figure 3:
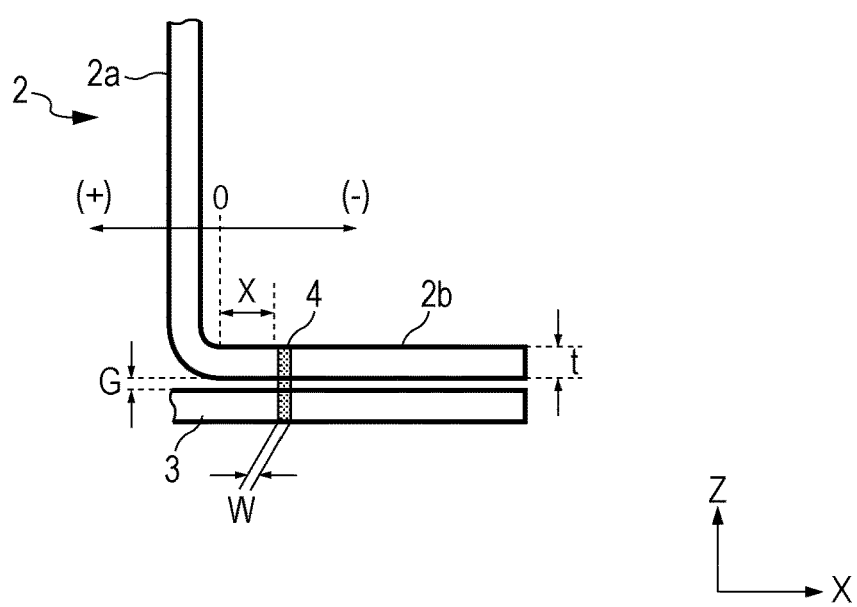
FIG. 3 is a cross-sectional view illustrating the configuration of the laser lap-welded joint according to an embodiment.
Figure 4:
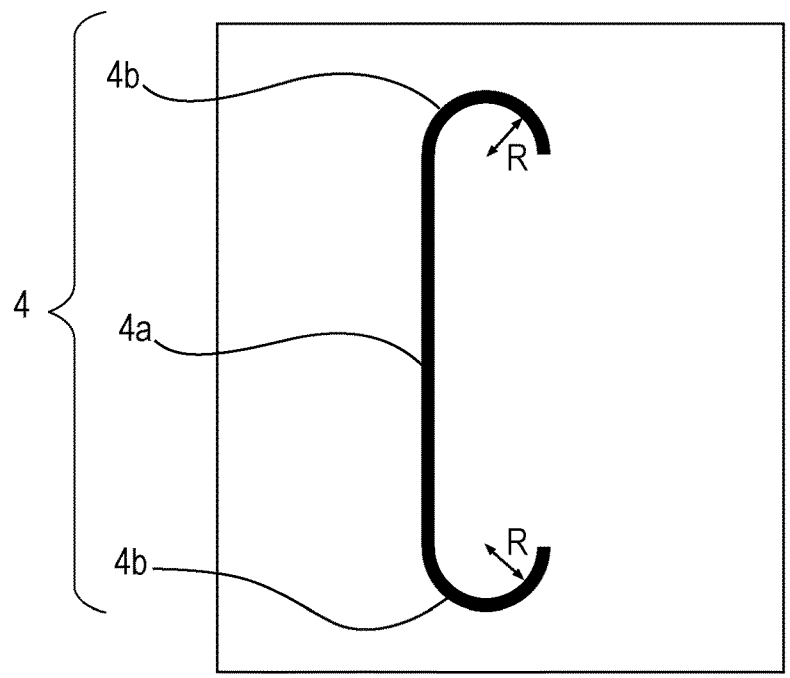
FIG. 4 is a top view of a welded portion included in the laser lap-welded joint according to an embodiment.

FIG. 2 is a top view illustrating the configuration of the laser lap-welded joint 1 according to an embodiment and is a diagram when the laser lap-welded joint 1 illustrated in FIG. 1 is viewed in the negative z-axis-direction. FIG. 3 is a cross-sectional view illustrating the configuration of the laser lap-welded joint 1 according to an embodiment taken along line A-A of FIG. 1 and illustrating the peripheral portion of one of the welded portions 4 of the laser lap-welded joint 1. FIG. 4 is a top view of one of the welded portions 4 included in the laser lap-welded joint 1.

As illustrated in FIG. 2, each of the welded portions 4 includes a first linear portion 4a that extends in a direction in which the welded portions 4 are arranged (the y direction in FIG. 2) and second linear portions 4b which are formed at the ends of the first linear portion 4a and each of the second linear portions 4b has a semicircular-shaped surface. Note that, in order to obtain a sufficient peel strength, it is preferable that all the second linear portions 4b of the plurality of welded portions 4 be formed so as to be oriented in the same direction. In the case illustrated in FIG. 2, all the second linear portions 4b are formed on the positive-X-axis-direction side with respect to the first linear portions 4a.

Regarding the radius R (mm) of the semicircular shape of each of the second linear portions 4b of the welded portions 4 illustrated in FIG. 4 and a sheet thickness t (mm) of one of the steel sheets having a sheet thickness larger than that of the other of the steel sheets, the following formula (1) is satisfied. Note that, in the disclosed embodiments, when the two steel sheets 2 and 3 have the same sheet thickness, the same sheet thickness is set to be the above-mentioned sheet thickness t.

$$0 < R \leq 1.5t \quad (1)$$

As illustrated in FIG. 3, regarding the gap G (mm) between the two steel sheets 2 and 3 and the sheet thickness t of the steel sheet having a sheet thickness larger than that of the other steel sheet, the following formula (2) is satisfied.

$$G \leq 0.25t \quad (2)$$

Regarding the pitch λ (mm) between the adjacent welded portions 4 and the length of each of the welded portions 4, that is, the weld length l (mm), which is the sum of the length of the first linear portion 4a and the lengths of the second linear portions 4b of each of the welded portions 4, which are illustrated in FIG. 2, l/λ satisfies the following formula (3). Note that the pitch λ is the center-to-center distance between the adjacent welded portions 4 in the longitudinal direction.

$$0.4 \leq l/\lambda < 0.7 \quad (3)$$

As illustrated in FIG. 3, the sheet thickness t of one of the steel sheets 2 and 3 having a sheet thickness larger than that of the other of the steel sheets 2 and 3 satisfies the following formula (4).

$$t \leq 4.0 \text{ mm} \quad (4)$$

The space X (mm) illustrated in FIGS. 2 and 3 between an end of a contact portion where the two steel sheets 2 and 3 are in contact with each other (see reference sign 0 in FIGS. 2 and 3) and each of the welded portions 4 satisfy the following formula (5).

$$2t \leq X \leq 4t \quad (5)$$

Regarding the sheet thickness t and the width W (mm) of each of the welded portions 4 illustrated in FIG. 3, W/t satisfies the following formula (6).

$$0.3 \leq W/t \leq 1.0 \quad (6)$$

In the laser lap-welded joint 1 according to the disclosed embodiments, precise adjustments are performed so as to satisfy the above formulas (1) and (2), and thus, a sufficient peel strength can be ensured, and dimensional accuracy can be improved by reducing strain due to thermal strain. In addition, by performing precise adjustments so as to satisfy the above formulas (3) to (6), a sufficient peel strength can be ensured, and the dimensional accuracy can be further improved by reducing strain due to thermal strain.

Reasons for establishing the above formulas (1) to (6) will be described below.

[$0 < R \leq 1.5t$]

As described above, the sheet thickness of one of the two steel sheets having a sheet thickness larger than that of the other of the steel sheets is denoted by t (mm), and in the case where the two steel sheets 2 and 3 have the same sheet thickness, the same sheet thickness is set to be the sheet thickness t. In the disclosed embodiments, the second linear portions 4b of the welded portions 4 have a specific semicircular shape, so that stress concentration at a welding start portion and at a welding end portion can be avoided. In each of the welded portions 4, when the radius R of the semicircular shape of each of the second linear portions 4b is greater than 1.5 t, the proportion of the length of a straight line portion of the welded portion 4 to the length of the welded portion 4 is small, and thus, a desired peel strength cannot be obtained. On the other hand, regardless of how small R (mm) is, as long as the welded portion 4 is formed so as to have a semicircular shape as each of the second linear portions 4b, the welded portion 4 can have a peel strength higher than that of a welded portion having a simple linear shape. Therefore, R is set to greater than 0 and 1.5 t or less. Preferably, R is 0.5 t or greater and 1.2 t or less.

[$G \leq 0.25t$]

When the gap (sheet gap) G (mm) between the steel sheets is greater than 0.25 t, burn-through occurs, and a desired peel strength and a desired shear strength cannot be obtained. Therefore, G is set to 0.25 t or less. Preferably, G is 0.1 t or greater and 0.2 t or less.

[$0.4 \leq l/\lambda < 0.7$]

It is more advantageous if the ratio (l/λ) of the weld length l of each of the welded portions 4 to the pitch λ (mm) is small from the standpoint of suppression of angular strain (the amount of change in the angle formed by the vertical wall portion 2a and the flange portion 2b between before and after welding), which is used as an index for evaluating strain due to thermal strain. When l/λ is 0.7 or greater, it is difficult to obtain a sufficient effect of suppressing the strain due to thermal strain. Therefore, l/λ is set to be less than 0.7. On the other hand, when l/λ is less than 0.4, a minimum required weld length l may sometimes not be ensured, and a sufficient peel strength may sometimes not be obtained. Therefore, l/λ is set to 0.4 or greater. In the manner described above, $1/\lambda$ is set to 0.4 or greater and less than 0.7. Preferably, $1/\lambda$ is 0.45 or greater and 0.65 or less, and more preferably, $1/\lambda$ is 0.50 or greater and 0.60 or less.

[$t \leq 4.0$ mm]

The sheet thickness t of one of the steel sheets having a sheet thickness larger than that of the other of the steel sheets is set to satisfy $t \leq 4.0$ mm. When t is greater than 4.0 mm, it is difficult to form the automobile framework component. Therefore, the sheet thickness t is set to satisfy $t \leq 4.0$ mm. Preferably, t is 1.0 mm or greater and 2.5 mm or less.

[$2t \leq X \leq 4t$]

When the space X (mm) becomes smaller than 2 t by arranging the welded portions 4 so as to be closer to an end 0 of a contact portion where the steel sheet 2, which is formed of the flange portion and the other portions, and the panel-shaped steel sheet 3 are in contact with each other, the end 0 being located on the closed cross section side, there is a case where fracture occurs in the welded portions 4 during an L-shaped tensile test, and this makes it difficult to obtain a desired peel strength. Therefore, X is set to 2 t or greater. On the other hand, when the space X becomes greater than 4 t by arranging the welded portions 4 so as to be farther away from the end 0 of the contact portion where the steel sheet 2, which is formed of the flange portion and the other portions, and the panel-shaped steel sheet 3 are in contact with each other, the end 0 being located on the closed cross section side, a moment that acts on the welded portions 4 increases, and this makes it difficult to obtain a desired peel strength. Therefore, X is set to 4 t or less. In the manner described above, the space X is set to 2 t or greater and 4 t or less. It is preferable that the space X be 2.5 t or greater and 3.5 t or less, and more preferably, 2.75 t or greater and 3.25 t or less.

Note that the welded portions 4 are positioned on the side on which a flange outer end of the flange portion 2b is present with respect to the end 0 of the contact portion (in a direction away from the vertical wall portion 2a, that is, the positive-X-axis-direction side in FIG. 3).

[$0.3 \leq W/t \leq 1.0$]

When the ratio W/t of the width W (mm) of each of the welded portions 4 to the sheet thickness t is less than 0.3, there is a case where the strength of each of the welded portions 4 is insufficient, so that fracture occurs in the welded portions 4 during a tensile test, and it becomes difficult to obtain a sufficient peel strength. Therefore, W/t is set to 0.3 or greater. On the other hand, when the ratio W/t of the width W of each of the welded portions 4 to the sheet thickness t is greater than 1.0, there is a case where angular strain increases, so that the dimensional accuracy decreases, and this may sometimes be determined as defective in terms of component appearance. Therefore, W/t is set to 1.0 or less. In the manner described above, W/t is set to 0.3 or greater and 1.0 or less. It is preferable that W/t be set to 0.4 or greater and 0.9 or less, and more preferably, 0.5 or greater and 0.8 or less.

[Composition of Two Steel Sheets]

Each of the steel sheets of the laser lap-welded joint 1 according to the disclosed embodiments has a composition containing, in % by mass, C: higher than 0.07% and 0.25% or lower, P+S: lower than 0.03%, Mn: 1.8% or higher and 3.0% or lower, Si: higher than 1.2% and 1.8% or lower, and having the balance being Fe and unavoidable impurities. The symbol "%" in each component of the composition refers to % by mass hereinafter. (C: higher than 0.07% and 0.25% or lower)

If the content of C is 0.07% or lower, there is a case where a precipitation strengthening effect cannot be obtained. On the other hand, if the content of C is higher than 0.25%, this leads to precipitation of a coarse carbide, and there is a case where a desired high strength and a desired workability cannot be ensured. Therefore, the content of C is set to be higher than 0.07% and 0.25% or lower.

(P+S: Lower than 0.03%)

When the sum (P+S) of the content of P and the content of S is 0.03% or higher, ductility and toughness deteriorate, and there is a case where a desired high strength and a desired workability cannot be ensured. Therefore, the sum (P+S) of the content of P and the content of S is set to be lower than 0.03%.

(Mn: 1.8% or Higher and 3.0% or Lower)

When the content of Mn is lower than 1.8%, there is a case where sufficient hardenability cannot be ensured, which in turn results in precipitation of a coarse carbide. On the other hand, when the content of Mn is 3.0% or lower, there is a case where the grain boundary embrittlement susceptibility increases, which in turn results in deterioration of toughness and cold-cracking resistance. Therefore, the content of Mn is set to 1.8% or higher and 3.0% or lower. It is preferable that the content of Mn be 2.5% or lower.

(Si: Higher than 1.2% and 1.8% or Lower)

When the content of Si is 1.2% or lower, there is a case where a sufficient effect of solid solution increasing the steel strength cannot be obtained. On the other hand, when the content of Si is higher than 1.8%, there is a case where the degree of hardening of a weld heat-affected zone increases, so that the toughness and the cold-cracking resistance of the weld heat-affected zone deteriorate. Therefore, the content of Si is set to be higher than 1.2% and 1.8% or lower. It is preferable that the content of Si be 1.5% or lower.

(Balance being Fe and Unavoidable Impurities)

The balance other than the elements in the above composition is Fe and unavoidable impurities. Examples of the unavoidable impurities include Al: 0.015 to 0.050%, N: 0.002 to 0.005%, and the like.

In addition, appropriate quantities of V, Nb, Ti, Cr, Mo, Cu, Ni, W, B and the like may be contained in accordance with required properties such as improved steel sheet strength and improved joint strength.

<Method of Manufacturing Laser Lap-Welded Joint>

A method of manufacturing the above-described laser lap-welded joint 1 according to the disclosed embodiments will now be described.

In the method of manufacturing the above-described laser lap-welded joint 1 according to the disclosed embodiments, one-side welding is performed on the two steel sheets 2 and 3 stacked one on top of the other. By performing one-side welding, space can be saved.

In the method of manufacturing the above-described laser lap-welded joint 1 according to the disclosed embodiments, it is preferable to start laser welding from the side of one of the two steel sheets 2 and 3 having a sheet thickness larger than that of the other of the steel sheets 2 and 3. Thereby burn-through can be prevented from occurring. Note that, in the case where the two steel sheets 2 and 3 have the same sheet thickness, laser welding may be started from the side of any one of the steel sheets.

Each of the steel sheets 2 and 3 has the above-mentioned composition and has a tensile strength TS of 980 MPa or greater.

In the above-mentioned laser welding, a laser beam L is radiated in a continuous manner. Fiber laser, disk laser, or the like can be used as the laser beam, and for example, the laser beam can be set as follows. Beam diameter: 0.4 to 1.2 mm, laser output: 2.0 to 5.0 kW, focal position: on the surface of the outermost layer of a steel sheet to 30 mm above the surface of the outermost layer of the steel sheet, and welding speed: 2.0 to 5.0 m/min. In this case, in order to increase a heat input efficiency, it is preferable to set the focal position on the surface of the steel sheet.

Figure 5:
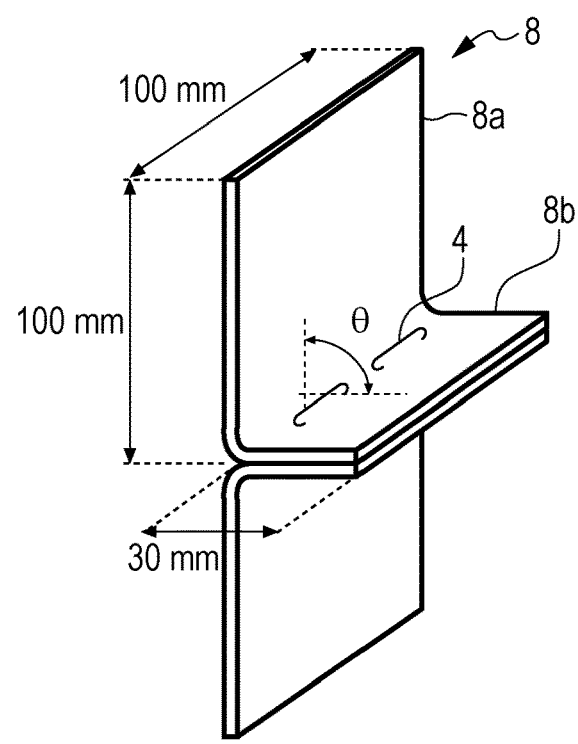
FIG. 5 is a perspective view of the laser lap-welded joint used in an example.

FIG. 5 is a diagram illustrating an example of the automobile framework component according to the disclosed embodiments. According to the method of manufacturing the laser lap-welded joint 1 of the disclosed embodiments, an automobile framework component including a flange portion such as that illustrated in FIG. 5 can be formed at high speed and with low strain.

As described above, in the disclosed embodiments, by setting the radius R of the semicircular shape of each of the second linear portions 4b of the welded portions 4 and the gap G between the two steel sheets to be within predetermined ranges and by setting the sheet thickness t, the space X between the end 0 of the contact portion where the two steel sheets are in contact with each other and each of the welded portions 4, the weld pitch λ, the weld length l, and the width W of each of the welded portions 4 to be within predetermined ranges, a laser lap-welded joint in which a sufficient peel strength is ensured and in which dimensional accuracy is improved by reducing strain due to thermal strain can be obtained, and an automobile framework component can also be obtained by using this joint.

In addition, in the disclosed embodiments, by starting welding from the side of the steel sheet having a larger sheet thickness, the likelihood of the gap between the sheets can be increased. Furthermore, by forming a predetermined gap between the sheets, when welding is performed, a weld metal spreads along the space between the sheets at the overlapping surfaces, and as a result, the welding area increases, so that not only the peel strength but also the shear strength can be increased.

Note that, although the case has been described above in which the laser lap-welded joint 1 is formed by welding together the steel sheet 2 formed of the flange portion and the other portions and the panel-shaped steel sheet 3, an automobile framework component may be formed by preparing two steel sheets 2, each of which is formed of a flange portion and other portions, and stacking the two steel sheets 2, each of which is formed of the flange portion and the other portions, one on top of the other in such a manner that the flange portions 2b of the two steel sheets 2 are superposed with each other.

EXAMPLE

The disclosed embodiments will be described below on the basis of an example.

The tensile strength and the chemical component of each sample are shown in Table 1. In Table 1, values are expressed in units of % by mass, and the balance other than the elements shown in Table 1 is Fe and unavoidable impurities. Steel sheets having sheet thicknesses of 1.2 mm, 1.6 mm, 1.8 mm, and 4.2 mm were used, and as illustrated in FIG. 5, bending was performed on these steel sheets such that each of the steel sheets had an L shape when viewed in cross section. L-shaped steel sheets 8 each have a long edge 8a and a short edge 8b. The long edge 8a corresponds to the vertical wall portion 2a of the steel sheet 2 of the laser lap-welded joint 1, and the short edge 8b corresponds to the flange portion 2b (see FIG. 1 again). Subsequently, the L-shaped steel sheets 8 having the same steel type and the same sheet thickness were stacked one on top of the other in such a manner that the short edges 8b of the L-shaped steel sheets 8 were superposed with each other, and then laser welding was intermittently performed in the longitudinal direction on a portion where the short edges 8b were superposed with each other so as to form weld beads (welded portions 4), so that a test piece was fabricated. Each of the L-shaped steel sheets 8 has a width of 100 mm, and the long edge 8a and the short edge 8b thereof have a length of 100 mm and a length of 30 mm, respectively.

Conditions of the weld beads (welded portions 4) formed by laser welding are shown in Table 2 and Table 3. The gap between the end 0 of a contact portion where the two steel sheets 8 are in contact with each other and each of the welded portions 4 is denoted by X (mm). The ratio of the weld length l (mm), which is the sum of the length of the first linear portion 4a and the lengths of the second linear portions 4b of each of the welded portions 4 to the pitch X (mm) between the adjacent welded portions 4 is denoted by l/λ. The ratio of the melt width W (mm) at the interface between the L-shaped steel sheets 8 to the sheet thickness t (mm) of each of the L-shaped steel sheets 8 is denoted by W/t. The radius of each of the semicircular shapes of the welded portions 4 is denoted by R (mm). The gap (sheet gap) between the steel sheets is denoted by G (mm). A Test was conducted by variously changing these values.

Note that the melt width W corresponds to the width of each of the weld beads (welded portions 4) at the interface between the L-shaped steel sheets 8 and was measured by observing, after welding, the cross section of the peripheral portion of the welded portion 4.

Fiber laser was used in the laser welding. In the laser welding, the welding speed was adjusted, and the melt width W of each of the weld beads was adjusted. The welding was performed in the atmosphere, and the focal position during the laser welding was set on a surface of the short edge 8b of the steel sheet.

Note that the tensile test was conducted in accordance with JIS Z3136 and at a speed of 10 mm/min, and measurement of angular strain was performed by measuring, with a laser displacement gauge, an amount of strain occurred in the steel sheet after welding and then converting the amount of strain into an angle by using the test piece size.

Shear strength was measured in accordance with JIS Z3136 and at a speed of 10 mm/min. Peel strength was measured at a speed of 10 mm/min by forming test pieces each having an L shape such as that illustrated in FIG. 5.

Among the test pieces, a test piece in which burn-through has occurred was determined to be rejected. In addition, a test piece having a peel strength that was more than 20% lower than that of a corresponding one of test piece numbers (test piece Nos. 1, 5, 9, 13, 17, and 21) each functioning as a reference among the samples, which were classified according to the steel type and the sheet thickness t, was determined to be rejected.

As for a method of performing the above classification, as shown in Table 2 and Table 3, the test piece Nos. 1 to 4 and 25 to 30 (the reference for these test piece numbers was the test piece No. 1) were classified as the 980 MPa class with a sheet thickness of 1.2 mm. The test piece Nos. 5 to 8, 31 to 36, and 44 to 47 (the reference for these test piece numbers was the test piece No. 5) were classified as the 980 MPa class with a sheet thickness of 1.6 mm. The test piece Nos. 9 to 12 and 37 to 42 (the reference for these test piece numbers was the test piece No. 9) were classified as the 980 MPa class with a sheet thickness of 1.8 mm. The test piece No. 43 (the reference for this test piece number was the test piece No. 9) was classified as the 980 MPa class with a sheet thickness of 4.2 mm. The test piece Nos. 13 to 16 and 48 to 53 (the reference for these test piece numbers was the test piece No. 13) were classified as the 1,180 MPa class with a sheet thickness of 1.2 mm. The test piece Nos. 17 to 20, 54 to 59, and 67 to 70 (the reference for these test piece numbers was the test piece No. 17) were classified as the 1,180 MPa class with a sheet thickness of 1.6 mm. The test piece Nos. 21 to 24 and 60 to 65 (the reference for these test piece numbers was the test piece No. 21) were classified as the 1,180 MPa class with a sheet thickness of 1.8 mm. The test piece No. 66 (the reference for this test piece number was the test piece No. 21) was classified as the 1,180 MPa class with a sheet thickness of 4.2 mm.

Regarding angular strain, a test piece in which the amount of angular strain occurred was equal to or lower than 110% of the amount of angular strain occurred in a corresponding one of the test piece numbers (test piece Nos. 1, 5, 9, 13, 17, and 21) each functioning as a reference among the above-mentioned samples, which were classified according to the steel type and the sheet thickness t, was determined to have a favorable dimensional accuracy and to be accepted.

Regarding shear strength, a test piece having a shear strength equal to or higher than 90% of that of a corresponding one of the above reference test piece numbers was determined to be accepted.

Regarding fractured portion, HAZ fracture was determined to be accepted as ductile fracture, and bead fracture was determined to be rejected as brittle fracture.

TABLE 1

| Sample No. | Tensile strength (MPa) | Composition (% by mass) | | | | | |
|---|---|---|---|---|---|---|---|
| | | C | P | S | Mn | Si | P + S |
| 1 | 1005 | 0.13 | 0.015 | 0.0020 | 2.20 | 1.40 | 0.017 |
| 2 | 1050 | 0.26 | 0.007 | 0.0008 | 2.10 | 1.50 | 0.008 |
| 3 | 1029 | 0.22 | 0.022 | 0.0020 | 1.80 | 2.50 | 0.024 |
| 4 | 1056 | 0.10 | 0.020 | 0.0015 | 3.10 | 1.30 | 0.022 |
| 5 | 1015 | 0.13 | 0.030 | 0.0040 | 2.10 | 1.38 | 0.034 |
| 6 | 1221 | 0.13 | 0.012 | 0.0010 | 2.20 | 1.40 | 0.013 |
| 7 | 1259 | 0.27 | 0.006 | 0.0006 | 2.30 | 1.65 | 0.007 |
| 8 | 1210 | 0.22 | 0.020 | 0.0020 | 1.80 | 2.50 | 0.022 |
| 9 | 1191 | 0.11 | 0.020 | 0.0010 | 3.35 | 1.35 | 0.021 |
| 10 | 1202 | 0.13 | 0.030 | 0.0030 | 2.20 | 1.42 | 0.033 |

The balance other than elements in the above composition is Fe and unavoidable impurities.

TABLE 2

| Test number | Sample No. | Sheet thickness t (mm) | Space X (mm) | $l/\lambda$ | W/t | Radius R (mm) of semicircular portion | Sheet gap G (mm) | Burn-through | Angular strain (rad) | Shear strength (kN) | Peel strength (kN) | Fractured portion | Notes |
|---|---|---|---|---|---|---|---|---|---|---|---|---|---|
| 1 | 1 | 1.2 | 3.6 | 0.6 | 0.5 | 1.2 | 0.2 | No | 0.008 | 40.3 | 9.3 | HAZ | Example |
| 2 | 1 | 1.2 | 3.6 | 0.6 | 0.5 | 2.4 | 0.2 | No | 0.007 | 41.2 | 6.6 | Bead | Comparative example |
| 3 | 1 | 1.2 | 3.6 | 0.6 | 0.5 | 1.2 | 0.4 | Yes | 0.008 | 44.6 | 5.0 | Bead | Comparative example |
| 4 | 1 | 1.2 | 3.6 | 0.6 | 0.5 | 2.4 | 0.4 | Yes | 0.008 | 43.7 | 4.0 | Bead | Comparative example |
| 25 | 1 | 1.2 | 6.0 | 0.6 | 0.5 | 1.2 | 0.2 | No | 0.008 | 40.4 | 3.6 | Bead | Comparative example |
| 26 | 1 | 1.2 | 1.2 | 0.6 | 0.5 | 1.2 | 0.2 | No | 0.008 | 41.3 | 5.1 | Bead | Comparative example |
| 27 | 1 | 1.2 | 3.6 | 0.3 | 0.5 | 1.2 | 0.2 | No | 0.005 | 24.2 | 5.0 | Bead | Comparative example |
| 28 | 1 | 1.2 | 3.6 | 0.8 | 0.5 | 1.2 | 0.2 | No | 0.014 | 48.3 | 11.5 | HAZ | Comparative example |
| 29 | 1 | 1.2 | 3.6 | 0.6 | 0.2 | 1.2 | 0.2 | No | 0.006 | 32.1 | 3.8 | Bead | Comparative example |
| 30 | 1 | 1.2 | 3.6 | 0.6 | 1.1 | 1.2 | 0.2 | No | 0.013 | 51.2 | 13.4 | HAZ | Comparative example |
| 5 | 1 | 1.6 | 3.2 | 0.6 | 0.5 | 1.6 | 0.25 | No | 0.011 | 53.8 | 12.8 | HAZ | Example |
| 6 | 1 | 1.6 | 4.8 | 0.6 | 0.5 | 3.2 | 0.25 | No | 0.010 | 55.1 | 10.1 | Bead | Comparative example |
| 7 | 1 | 1.6 | 4.8 | 0.6 | 0.5 | 1.6 | 0.5 | Yes | 0.009 | 58.8 | 7.6 | Bead | Comparative example |
| 8 | 1 | 1.6 | 4.8 | 0.6 | 0.5 | 3.2 | 0.5 | Yes | 0.010 | 59.7 | 6.2 | Bead | Comparative example |
| 31 | 1 | 1.6 | 8.0 | 0.6 | 0.5 | 1.6 | 0.25 | No | 0.011 | 51.4 | 7.2 | Bead | Comparative example |
| 32 | 1 | 1.6 | 1.6 | 0.6 | 0.5 | 1.6 | 0.25 | No | 0.010 | 50.9 | 8.0 | Bead | Comparative example |
| 33 | 1 | 1.6 | 4.8 | 0.3 | 0.5 | 1.6 | 0.25 | No | 0.007 | 30.2 | 4.8 | Bead | Comparative example |
| 34 | 1 | 1.6 | 4.8 | 0.8 | 0.5 | 1.6 | 0.25 | No | 0.014 | 67.4 | 14.6 | HAZ | Comparative example |
| 35 | 1 | 1.6 | 4.8 | 0.6 | 0.2 | 1.6 | 0.25 | No | 0.006 | 29.7 | 4.4 | Bead | Comparative example |
| 36 | 1 | 1.6 | 4.8 | 0.6 | 1.1 | 1.6 | 0.25 | No | 0.015 | 65.1 | 13.6 | HAZ | Comparative example |
| 44 | 2 | 1.6 | 4.8 | 0.6 | 0.5 | 1.6 | 0.25 | No | 0.009 | 55.0 | 9.8 | Bead | Comparative example |
| 45 | 3 | 1.6 | 4.8 | 0.6 | 0.5 | 1.6 | 0.25 | No | 0.009 | 53.5 | 8.9 | Bead | Comparative example |

TABLE 2-continued

| Test number | Sample No. | Sheet thickness t (mm) | Space X (mm) | I/λ | W/t | Radius R (mm) of semicircular portion | Sheet gap G (mm) | Burn-through | Angular strain (rad) | Shear strength (kN) | Peel strength (kN) | Fractured portion | Notes |
|---|---|---|---|---|---|---|---|---|---|---|---|---|---|
| 46 | 4 | 1.6 | 4.8 | 0.6 | 0.5 | 1.6 | 0.25 | No | 0.009 | 57.9 | 10.2 | Bead | Comparative example |
| 47 | 5 | 1.6 | 4.8 | 0.6 | 0.5 | 1.6 | 0.25 | No | 0.009 | 49.8 | 7.4 | Bead | Comparative example |
| 9 | 1 | 1.8 | 5.4 | 0.6 | 0.5 | 1.8 | 0.3 | No | 0.011 | 61.1 | 14.1 | HAZ | Example |
| 10 | 1 | 1.8 | 5.4 | 0.6 | 0.5 | 3.6 | 0.3 | No | 0.013 | 61.0 | 10.2 | Bead | Comparative example |
| 11 | 1 | 1.8 | 5.4 | 0.6 | 0.5 | 1.8 | 0.6 | Yes | 0.012 | 64.3 | 8.5 | Bead | Comparative example |
| 12 | 1 | 1.8 | 5.4 | 0.6 | 0.5 | 3.6 | 0.6 | Yes | 0.012 | 67.2 | 6.7 | Bead | Comparative example |
| 37 | 1 | 1.8 | 9.0 | 0.6 | 0.5 | 1.8 | 0.3 | No | 0.011 | 60.0 | 10.1 | Bead | Comparative example |
| 38 | 1 | 1.8 | 1.8 | 0.6 | 0.5 | 1.8 | 0.3 | No | 0.010 | 57.2 | 9.9 | Bead | Comparative example |
| 39 | 1 | 1.8 | 5.4 | 0.3 | 0.5 | 1.8 | 0.3 | No | 0.008 | 47.2 | 7.9 | Bead | Comparative example |
| 40 | 1 | 1.8 | 5.4 | 0.8 | 0.5 | 1.8 | 0.3 | No | 0.017 | 78.9 | 13.7 | HAZ | Comparative example |
| 41 | 1 | 1.8 | 5.4 | 0.6 | 0.2 | 1.8 | 0.3 | No | 0.009 | 43.2 | 6.6 | Bead | Comparative example |
| 42 | 1 | 1.8 | 5.4 | 0.6 | 1.1 | 1.8 | 0.3 | No | 0.017 | 77.9 | 15.2 | HAZ | Comparative example |
| 43 | 1 | 4.2 | 12.6 | 0.6 | 1.1 | 2.4 | 0.4 | No | 0.035 | 79.5 | 15.2 | HAZ | Comparative example |
| 13 | 6 | 1.2 | 3.6 | 0.6 | 0.5 | 1.2 | 0.2 | No | 0.007 | 38.1 | 9.9 | HAZ | Example |
| 14 | 6 | 1.2 | 3.6 | 0.6 | 0.5 | 2.4 | 0.2 | No | 0.007 | 40.2 | 6.7 | Bead | Comparative example |
| 15 | 6 | 1.2 | 3.6 | 0.6 | 0.5 | 1.2 | 0.4 | Yes | 0.008 | 44.6 | 5.5 | Bead | Comparative example |
| 16 | 6 | 1.2 | 3.6 | 0.6 | 0.5 | 2.4 | 0.4 | Yes | 0.008 | 40.9 | 4.1 | Bead | Comparative example |
| 48 | 6 | 1.2 | 6.0 | 0.6 | 0.5 | 1.2 | 0.2 | No | 0.009 | 39.6 | 4.2 | Bead | Comparative example |
| 49 | 6 | 1.2 | 1.2 | 0.6 | 0.5 | 1.2 | 0.2 | No | 0.008 | 41.5 | 5.0 | Bead | Comparative example |
| 50 | 6 | 1.2 | 3.6 | 0.3 | 0.5 | 1.2 | 0.2 | No | 0.006 | 23.2 | 4.5 | Bead | Comparative example |
| 51 | 6 | 1.2 | 3.6 | 0.8 | 0.5 | 1.2 | 0.2 | No | 0.013 | 46.3 | 10.5 | HAZ | Comparative example |
| 52 | 6 | 1.2 | 3.6 | 0.6 | 0.2 | 1.2 | 0.2 | No | 0.006 | 30.2 | 3.6 | Bead | Comparative example |
| 53 | 6 | 1.2 | 3.6 | 0.6 | 1.1 | 1.2 | 0.2 | No | 0.014 | 49.9 | 12.7 | HAZ | Comparative example |

TABLE 3

| Test number | Sample No. | Sheet thickness t (mm) | Space X (mm) | I/λ | W/t | Radius R (mm) of semicircular portion | Sheet gap G (mm) | Burn-through | Angular strain (rad) | Shear strength (kN) | Peel strength (kN) | Fractured portion | Notes |
|---|---|---|---|---|---|---|---|---|---|---|---|---|---|
| 17 | 6 | 1.6 | 4.8 | 0.6 | 0.5 | 1.6 | 0.25 | No | 0.009 | 54.1 | 13.1 | HAZ | Example |
| 18 | 6 | 1.6 | 4.8 | 0.6 | 0.5 | 3.2 | 0.25 | No | 0.009 | 55.5 | 9.9 | Bead | Comparative example |
| 19 | 6 | 1.6 | 4.8 | 0.6 | 0.5 | 1.6 | 0.5 | Yes | 0.010 | 59.2 | 8.6 | Bead | Comparative example |
| 20 | 6 | 1.6 | 4.8 | 0.6 | 0.5 | 3.2 | 0.5 | Yes | 0.011 | 59.0 | 6.4 | Bead | Comparative example |
| 54 | 6 | 1.6 | 8.0 | 0.6 | 0.5 | 1.6 | 0.25 | No | 0.010 | 49.7 | 6.4 | Bead | Comparative example |
| 55 | 6 | 1.6 | 1.6 | 0.6 | 0.5 | 1.6 | 0.25 | No | 0.010 | 50.8 | 6.9 | Bead | Comparative example |
| 56 | 6 | 1.6 | 4.8 | 0.3 | 0.5 | 1.6 | 0.25 | No | 0.007 | 28.2 | 4.3 | Bead | Comparative example |
| 57 | 6 | 1.6 | 4.8 | 0.8 | 0.5 | 1.6 | 0.25 | No | 0.015 | 65.0 | 14.3 | HAZ | Comparative example |
| 58 | 6 | 1.6 | 4.8 | 0.6 | 0.2 | 1.6 | 0.25 | No | 0.006 | 28.8 | 4.2 | Bead | Comparative example |
| 59 | 6 | 1.6 | 4.8 | 0.6 | 1.1 | 1.6 | 0.25 | No | 0.015 | 63.4 | 12.9 | HAZ | Comparative example |
| 67 | 7 | 1.6 | 4.8 | 0.6 | 0.5 | 1.6 | 0.25 | No | 0.009 | 58.3 | 8.7 | Bead | Comparative example |

TABLE 3-continued

| Test number | Sample No. | Sheet thickness t (mm) | Space X (mm) | l/λ | W/t | Radius R (mm) of semicircular portion | Sheet gap G (mm) | Burn-through | Angular strain (rad) | Shear strength (kN) | Peel strength (kN) | Fractured portion | Notes |
|---|---|---|---|---|---|---|---|---|---|---|---|---|---|
| 68 | 8 | 1.6 | 4.8 | 0.6 | 0.5 | 1.6 | 0.25 | No | 0.009 | 50.4 | 8.7 | Bead | Comparative example |
| 69 | 9 | 1.6 | 4.8 | 0.6 | 0.5 | 1.6 | 0.25 | No | 0.009 | 48.4 | 6.5 | Bead | Comparative example |
| 70 | 10 | 1.6 | 4.8 | 0.6 | 0.5 | 1.6 | 0.25 | No | 0.008 | 49.8 | 6.3 | Bead | Comparative example |
| 21 | 6 | 1.8 | 5.4 | 0.6 | 0.5 | 1.8 | 0.3 | No | 0.011 | 65.2 | 14.0 | HAZ | Example |
| 22 | 6 | 1.8 | 5.4 | 0.6 | 0.5 | 3.6 | 0.3 | No | 0.013 | 60.3 | 10.5 | Bead | Comparative example |
| 23 | 6 | 1.8 | 5.4 | 0.6 | 0.5 | 1.8 | 0.6 | Yes | 0.012 | 63.2 | 9.3 | Bead | Comparative example |
| 24 | 6 | 1.8 | 5.4 | 0.6 | 0.5 | 3.6 | 0.6 | Yes | 0.013 | 64.5 | 7.1 | Bead | Comparative example |
| 60 | 6 | 1.8 | 9.0 | 0.6 | 0.5 | 1.8 | 0.3 | No | 0.012 | 62.6 | 11.1 | Bead | Comparative example |
| 61 | 6 | 1.8 | 1.8 | 0.6 | 0.5 | 1.8 | 0.3 | No | 0.011 | 57.3 | 9.3 | Bead | Comparative example |
| 62 | 6 | 1.8 | 5.4 | 0.3 | 0.5 | 1.8 | 0.3 | No | 0.007 | 48.1 | 6.8 | Bead | Comparative example |
| 63 | 6 | 1.8 | 5.4 | 0.8 | 0.5 | 1.8 | 0.3 | No | 0.016 | 80.1 | 12.5 | HAZ | Comparative example |
| 64 | 6 | 1.8 | 5.4 | 0.6 | 0.2 | 1.8 | 0.3 | No | 0.009 | 40.1 | 5.2 | Bead | Comparative example |
| 65 | 6 | 1.8 | 5.4 | 0.6 | 1.1 | 1.8 | 0.3 | No | 0.018 | 75.8 | 13.8 | HAZ | Comparative example |
| 66 | 6 | 4.2 | 12.6 | 0.6 | 1.1 | 2.4 | 0.4 | No | 0.033 | 77.5 | 14.6 | HAZ | Comparative example |

As shown in Table 1, each of the test pieces (test piece Nos. 1, 5, 9, 13, 17, and 21) according to the example of the disclosed embodiments had a favorable peel strength, a small amount of angular strain, and a favorable dimensional accuracy. In addition, in each of the test pieces according to the example of the disclosed embodiments, burn-through was prevented from occurring. Furthermore, each of the test pieces according to the example of the disclosed embodiments has a high shear strength, and the flange portion thereof was prevented from sliding and being displaced. Furthermore, in each of the test pieces according to the example of the disclosed embodiments, a fractured portion was in a HAZ, and it was confirmed that stress concentration was avoidable. In contrast, in all the comparative examples, fractured portions were at beads, and it was found that stress concentration would occur.

In addition, among the test pieces according to the comparative examples, the radius R of the test piece No. 2 was greater than 1.5 t, and a desired peel strength was not obtained.

In the test piece No. 3, the gap G between the steel sheets was greater than 0.25 t, and a desired peel strength was not obtained.

In the test piece No. 4, the radius R was greater than 1.5 t, and the gap G between the steel sheets was greater than 0.25 t. A desired peel strength was not obtained.

In the test piece No. 25, the space X was greater than 4 t, and a desired peel strength was not obtained.

In the test piece No. 26, the space X was less than 2 t, and a desired peel strength was not obtained.

In the test piece No. 27, l/λ was less than 0.4, and a desired peel strength was not obtained.

In the test piece No. 28, l/λ was greater than 0.7, and the dimensional accuracy was unfavorable.

In the test piece No. 29, W/t was less than 0.3, and a desired peel strength was not obtained.

In the test piece No. 30, W/t was greater than 1.0, and the dimensional accuracy was unfavorable.

In the test piece No. 6, the radius R was greater than 1.5 t, and a desired peel strength was not obtained.

In the test piece No. 7, the gap G between the steel sheets was greater than 0.25 t, and a desired peel strength was not obtained.

In the test piece No. 8, the radius R was greater than 1.5 t, and the gap G between the steel sheets was greater than 0.25 t. A desired peel strength was not obtained.

In the test piece No. 31, the space X was greater than 4 t, and a desired peel strength was not obtained.

In the test piece No. 32, the space X was less than 2 t, and a desired peel strength was not obtained.

In the test piece No. 33, l/λ was less than 0.4, and a desired peel strength was not obtained.

In the test piece No. 34, l/λ was greater than 0.7, and the dimensional accuracy was unfavorable.

In the test piece No. 35, W/t was less than 0.3, and a desired peel strength was not obtained.

In the test piece No. 36, W/t was greater than 1.0, and the dimensional accuracy was unfavorable.

In the test piece No. 44, C was higher than 0.25%, and a desired peel strength was not obtained.

In the test piece No. 45, Si was higher than 1.8%, and a desired peel strength was not obtained.

In the test piece No. 46, Mn was higher than 3.0%, and a desired peel strength was not obtained.

In the test piece No. 47, P+S was higher than 0.03%, and a desired peel strength was not obtained.

In the test piece No. 10, the radius R was greater than 1.5 t, and a desired peel strength was not obtained. In addition, the dimensional accuracy was unfavorable.

In the test piece No. 11, the gap G between the steel sheets was greater than 0.25 t, and a desired peel strength was not obtained.

In the test piece No. 12, the radius R was greater than 1.5 t, and the gap G between the steel sheets was greater than 0.25 t. A desired peel strength was not obtained.

In the test piece No. 37, the space X was greater than 4 t, and a desired peel strength was not obtained.

In the test piece No. 38, the space X was less than 2 t, and a desired peel strength was not obtained.

In the test piece No. 39, l/λ was less than 0.4, and a desired peel strength was not obtained.

In the test piece No. 40, l/λ was greater than 0.7, and the dimensional accuracy was unfavorable.

In the test piece No. 41, W/t was less than 0.3, and a desired peel strength was not obtained.

In the test piece No. 42, W/t was greater than 1.0, and the dimensional accuracy was unfavorable.

In the test piece No. 43, piercing welding could not be performed unless the welding speed was reduced. In addition, W/t was greater than 1.0 and the dimensional accuracy was unfavorable.

In the test piece No. 14, the radius R was greater than 1.5 t, and a desired peel strength was not obtained.

In the test piece No. 15, the gap G between the steel sheets was greater than 0.25 t, and a desired peel strength was not obtained. In addition, the dimensional accuracy was unfavorable.

In the test piece No. 16, the radius R was greater than 1.5 t, and the gap G between the steel sheets was greater than 0.25 t. A desired peel strength was not obtained, and also the dimensional accuracy was unfavorable.

In the test piece No. 48, the space X was greater than 4 t, and a desired peel strength was not obtained.

In the test piece No. 49, the space X was less than 2 t, and a desired peel strength was not obtained.

In the test piece No. 50, l/λ was less than 0.4, and a desired peel strength was not obtained.

In the test piece No. 51, l/λ was greater than 0.7, and the dimensional accuracy was unfavorable.

In the test piece No. 52, W/t was less than 0.3, and a desired peel strength was not obtained.

In the test piece No. 53, W/t was greater than 1.0, and the dimensional accuracy was unfavorable.

In the test piece No. 18, the radius R was greater than 1.5 t, and a desired peel strength was not obtained.

In the test piece No. 19, the gap G between the steel sheets was greater than 0.25 t, and a desired peel strength was not obtained. In addition, the dimensional accuracy was unfavorable.

In the test piece No. 20, the radius R was greater than 1.5 t, and the gap G between the steel sheets was greater than 0.25 t. A desired peel strength was not obtained, and also the dimensional accuracy was unfavorable.

In the test piece No. 54, the space X was greater than 4 t, and a desired peel strength was not obtained.

In the test piece No. 55, the space X was less than 2 t, and a desired peel strength was not obtained.

In the test piece No. 56, l/λ was less than 0.4, and a desired peel strength was not obtained.

In the test piece No. 57, l/λ was greater than 0.7, and the dimensional accuracy was unfavorable.

In the test piece No. 58, W/t was less than 0.3, and a desired peel strength was not obtained.

In the test piece No. 59, W/t was greater than 1.0, and the dimensional accuracy was unfavorable.

In the test piece No. 67, C was higher than 0.25%, and a desired peel strength was not obtained.

In the test piece No. 68, Si was higher than 1.8%, and a desired peel strength was not obtained.

In the test piece No. 69, Mn was higher than 3.0%, and a desired peel strength was not obtained.

In the test piece No. 70, P+S was 0.03% or higher, and a desired peel strength was not obtained.

In the test piece No. 22, the radius R was greater than 1.5 t, and a desired peel strength was not obtained. In addition, the dimensional accuracy was unfavorable.

In the test piece No. 23, the gap G between the steel sheets was greater than 0.25 t, and a desired peel strength was not obtained.

In the test piece No. 24, the radius R was greater than 1.5 t, and the gap G between the steel sheets was greater than 0.25 t. A desired peel strength was not obtained, and also the dimensional accuracy was unfavorable.

In the test piece No. 60, the space X was greater than 4 t, and a desired peel strength was not obtained.

In the test piece No. 61, the space X was less than 2 t, and a desired peel strength was not obtained.

In the test piece No. 62, l/λ was less than 0.4, and a desired peel strength was not obtained.

In the test piece No. 63, l/λ was greater than 0.7, and the dimensional accuracy was unfavorable.

In the test piece No. 64, W/t was less than 0.3, and a desired peel strength was not obtained.

In the test piece No. 65, W/t was greater than 1.0, and the dimensional accuracy was unfavorable.

In the test piece No. 66, piercing welding could not be performed unless the welding speed was reduced. In addition, W/t was greater than 1.0, and the dimensional accuracy was unfavorable.

REFERENCE SIGNS LIST 1 laser lap-welded joint
2 steel sheet (steel sheet formed of flange portion and other portions)
2a vertical wall portion
2b flange portion
3 steel sheet (panel-shaped steel sheet)
4 welded portion
4a first linear portion
4b second linear portion
8 L-shaped steel sheet
8a long edge
8b short edge
L laser

The invention claimed is:

1. A laser lap-welded joint comprising:
two steel sheets, at least one of the two steel sheets having a tensile strength TS of 980 MPa or more and a chemical composition comprising, by mass %:
C: more than 0.07% and 0.25% or less;
P+S: less than 0.03%;
Mn: 1.8% or more and 3.0% or less;
Si: more than 1.2% and 1.8% or less; and
a balance being Fe and unavoidable impurities; and
a plurality of welded portions that are formed by welding and joining together the two steel sheets which are in a state of being stacked one on top of the other,
wherein each of the plurality of welded portions has a C-shaped surface being arranged in an array,
each of the welded portions is formed of a first linear portion extending in an array direction and second linear portions which are formed at respective ends of the first linear portion and each of the second linear portions has a surface having a semicircular shape,
wherein a radius R (mm) of the semicircular shape and a sheet thickness t (mm) of one of the steel sheets having a sheet thickness larger than a sheet thickness of the other of the steel sheets, or when the two steel sheets have an identical sheet thickness, the two steel sheets, satisfy a formula (1):

$$0 < R \leq 1.5t \qquad (1),$$

a gap G (mm) between the two steel sheets and the sheet thickness t satisfy a formula (2):

$$G \leq 0.25t \qquad (2),$$

a ratio $l/\lambda$ of a weld length l (mm), which is a sum of a length of the first linear portion and lengths of the second linear portions in each of the welded portions, to a pitch $\lambda$ (mm) between the welded portions that are adjacent to each other satisfies a formula (3):

$$0.4 \leq l/\lambda < 0.7 \qquad (3),$$

the sheet thickness t satisfies a formula (4):

$$t \leq 4.0 \text{ mm} \qquad (4),$$

a space X (mm) between an end of a contact portion where the two steel sheets are in contact with each other and each of the welded portions satisfies a formula (5):

$$2t \leq X \leq 4t \qquad (5), \text{ and}$$

a ratio W/t of a width W (mm) of each of the welded portions to the sheet thickness t satisfies a formula (6):

$$0.3 \leq W/t \leq 1.0 \qquad (6).$$

2. A method of manufacturing the laser lap-welded joint according to claim 1, the method comprising:
stacking the two steel sheets one on top of the other; and
performing one-side laser welding in which a laser is radiated onto a surface of one of the two steel sheets.

3. The method according to claim 2, wherein the surface is on a side of the one of the two steel sheets having the sheet thickness larger than the sheet thickness of the other of the steel sheets.

4. An automobile framework component comprising the laser lap-welded joint according to claim 1.

* * * * *